United States Patent
Yoshino

(10) Patent No.: US 12,508,850 B2
(45) Date of Patent: Dec. 30, 2025

(54) HEAVY DUTY TIRE

(71) Applicant: SUMITOMO RUBBER INDUSTRIES, LTD., Kobe (JP)

(72) Inventor: Masayuki Yoshino, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 0 days.

(21) Appl. No.: 18/209,924

(22) Filed: Jun. 14, 2023

(65) Prior Publication Data

US 2023/0415521 A1 Dec. 28, 2023

(30) Foreign Application Priority Data

Jun. 24, 2022 (JP) .................................. 2022-101569

(51) Int. Cl.
*B60C 15/06* (2006.01)
*B60C 19/00* (2006.01)

(52) U.S. Cl.
CPC .......... *B60C 19/00* (2013.01); *B60C 15/0607* (2013.01); *B60C 15/0635* (2013.01); *B60C 2015/061* (2013.01); *B60C 2015/0621* (2013.01); *B60C 2015/0692* (2013.01); *B60C 2019/004* (2013.01); *B60C 2200/06* (2013.01)

(58) Field of Classification Search
CPC ............ B60C 15/0607; B60C 15/0635; B60C 2019/004; B60C 23/0493; B60C 2015/061
See application file for complete search history.

(56) References Cited

U.S. PATENT DOCUMENTS

| | | | |
|---|---|---|---|
| 2019/0300680 A1* | 10/2019 | Cho | ....................... B60C 19/00 |
| 2020/0016934 A1* | 1/2020 | Kagimoto | ............. B60C 9/1835 |
| 2020/0207161 A1* | 7/2020 | Suita | ....................... B60C 15/06 |

FOREIGN PATENT DOCUMENTS

| | | | | |
|---|---|---|---|---|
| DE | 102019113682 A1 * | 1/2020 | ............. | B60C 15/06 |
| JP | 2018001806 A * | 1/2018 | | |
| JP | 2018111433 A * | 7/2018 | ......... | B60C 15/0628 |
| JP | 2021-46057 A | 3/2021 | | |

OTHER PUBLICATIONS

English machine translation of DE-102019113682-A1 (Year: 2020).*
English machine translation of JP-2018111433-A (Year: 2018).*
English machine translation of JP-2018001806-A (Year: 2018).*

* cited by examiner

*Primary Examiner* — Robert C Dye
(74) *Attorney, Agent, or Firm* — Birch, Stewart, Kolasch & Birch, LLP

(57) ABSTRACT

A tire 2 includes a pair of beads 10, a carcass 12, a pair of steel reinforcing layers 20, a pair of fiber reinforcing layers 26, and a tag member 28. Each bead 10 includes an apex 40. A carcass ply 48 included in the carcass 12 includes a ply body 50 and a pair of turned-up portions 52. An outer end PR1 of each fiber reinforcing layer 26 is located between an end PF of the turned-up portion 52 and an outer end PA of the apex 40. An RFID tag 62 of the tag member 28 is located between the end PF of the turned-up portion 52 and the outer end PA of the apex 40. In the fiber reinforcing layer 26, an outer end 60f of a second reinforcing ply 60 is located radially outward of an outer end 58f of a first reinforcing ply 58.

14 Claims, 4 Drawing Sheets

HEAVY DUTY TIRE

CROSS REFERENCE TO RELATED APPLICATION

This application claims priority on Japanese Patent Application No. 2022-101569 filed on Jun. 24, 2022, the entire content of which is incorporated herein by reference.

TECHNICAL FIELD

The present invention relates to heavy duty tires.

BACKGROUND ART

In order to manage data regarding manufacturing management, customer information, running history, etc., of tires, incorporation of radio frequency identification (RFID) tags into tires has been proposed. Various studies have been conducted for the technology to incorporate an RFID tag into a tire (for example, PATENT LITERATURE 1 below).

CITATION LIST

Patent Literature

PATENT LITERATURE 1: Japanese Laid-Open Patent Publication No. 2021-046057

SUMMARY OF THE INVENTION

Technical Problem

From the viewpoint of preventing damage, an RFID tag is provided in a portion of a tire where the degree of bending is small. In the case of a heavy duty tire, each bead portion has high stiffness. The bead portion has been considered as a location for placing the RFID tag.

A tire includes a carcass extending on and between a pair of beads. The carcass includes a carcass ply. The carcass ply is turned up around the beads. In the case of a heavy duty tire, each turned-up portion of the carcass ply is placed such that an end thereof overlaps an apex of the bead.

The carcass ply includes a large number of carcass cords aligned with each other. In a heavy duty tire, steel cords are used as the carcass cords. If the RFID tag is placed near metal components such as steel cords, there is a concern that radio waves may be disturbed.

In the heavy duty tire, if the RFID tag is set in the bead portion, from the viewpoint of ensuring a distance from metal components, it has been considered to place the RFID tag on the axially outer side of the apex in a zone between the end of the turned-up portion and the end of the apex.

In the case where a carrying capacity is large and a large load is applied to the tire, or in the case where consideration for uneven wear is required, a structure in which a fiber reinforcing layer composed of a layer of a cord formed from an organic fiber such as a nylon fiber is added to a steel reinforcing layer composed of a layer of a steel cord is applied to each bead portion. Usually, the fiber reinforcing layer is composed of two reinforcing plies. As a result of the addition of the fiber reinforcing layer, two ends of the reinforcing plies are added on the axially outer side of the apex. Strain is likely to be concentrated on the ends of the reinforcing plies. Therefore, in the tire in which the fiber reinforcing layer is added to each bead portion, care has to be taken to prevent damage starting from the end of the reinforcing ply or the RFID tag.

The present invention has been made in view of such circumstances. An object of the present invention is to provide a heavy duty tire that can achieve formation of a good communication environment and reduction of the risk of damage to an RFID tag while suppressing influence on durability.

Solution To Problem

A heavy duty tire according to the present invention includes: a pair of beads; a carcass extending on and between the pair of beads; a pair of chafers each configured to come into contact with a rim; a pair of steel reinforcing layers each located between the bead and the chafer; a pair of fiber reinforcing layers each located between the steel reinforcing layer and the chafer; and a tag member including an RFID tag. Each of the beads includes a core and an apex located radially outward of the core. The carcass includes a carcass ply, and the carcass ply includes a ply body extending between the pair of beads and a pair of turned-up portions each connected to the ply body and turned up around the bead. The steel reinforcing layer includes a steel cord, and the fiber reinforcing layer includes an organic fiber cord. The steel reinforcing layer is placed so as to wrap a radially inner portion of the bead from a radially inner side of the turned-up portion. An inner end and an outer end of the steel reinforcing layer are located between an end of the turned-up portion and the core in a radial direction. An inner end of the fiber reinforcing layer is located radially inward of the inner end of the steel reinforcing layer. An outer end of the fiber reinforcing layer is located between the end of the turned-up portion and an outer end of the apex in the radial direction. The fiber reinforcing layer includes a first reinforcing ply and a second reinforcing ply. An inner end of the first reinforcing ply is the inner end of the fiber reinforcing layer, and an outer end of the second reinforcing ply is the outer end of the fiber reinforcing layer. The tag member is in contact with the apex on a radially outer side of the end of the turned-up portion. The RFID tag is located between the end of the turned-up portion and the outer end of the apex in the radial direction. The outer end of the second reinforcing ply is located radially outward of an outer end of the first reinforcing ply.

Advantageous Effects Of The Invention

According to the present invention, a heavy duty tire that can achieve formation of a good communication environment and reduction of the risk of damage to an RFID tag while suppressing influence on durability, is obtained.

DETAILED DESCRIPTION

Figure 1:
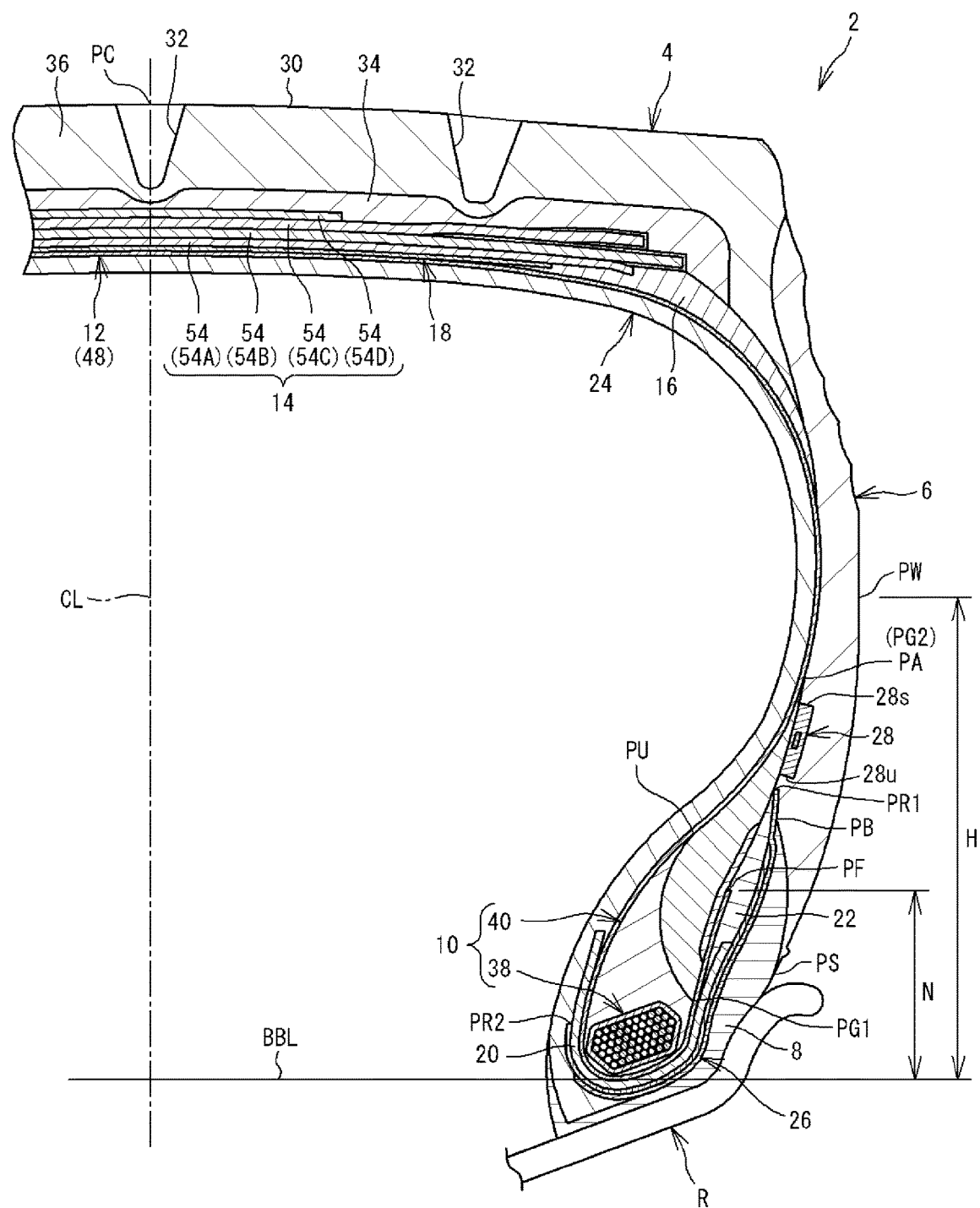
FIG. 1 is a cross-sectional view showing a part of a heavy duty tire.

The following will describe in detail the present invention based on preferred embodiments with appropriate reference to the drawings.

A tire of the present disclosure is fitted on a rim. The interior of the tire is filled with air to adjust the internal pressure of the tire. The tire fitted on the rim is also referred to as tire-rim assembly. The tire-rim assembly includes the rim and the tire fitted on the rim.

In the present disclosure, a state where a tire is fitted on a normal rim, the internal pressure of the tire is adjusted to a normal internal pressure, and no load is applied to the tire is referred to as a normal state.

In the present disclosure, unless otherwise specified, the dimensions and angles of each component of the tire are measured in the normal state.

The dimensions and angles of each component in a meridian cross-section of the tire, which cannot be measured in a state where the tire is fitted on the normal rim, are measured in a cut surface of the tire obtained by cutting the tire along a plane including the rotation axis of the tire. In this measurement, the tire is set such that the distance between right and left beads is made equal to the distance between the beads in the tire that is fitted on the normal rim. A component, of the tire, which cannot be confirmed in a state where the tire is fitted on the normal rim is confirmed in the above-described cut surface.

The normal rim means a rim specified in a standard on which the tire is based. The "standard rim" in the JATMA standard, the "Design Rim" in the TRA standard, and the "Measuring Rim" in the ETRTO standard are normal rims.

The normal internal pressure means an internal pressure specified in the standard on which the tire is based. The "highest air pressure" in the JATMA standard, the "maximum value" recited in the "TIRE LOAD LIMITS AT VARIOUS COLD INFLATION PRESSURES" in the TRA standard, and the "INFLATION PRESSURE" in the ETRTO standard are normal internal pressures.

A normal load means a load specified in the standard on which the tire is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRTO standard are normal loads.

In the present disclosure, a tread portion of the tire is a portion of the tire that comes into contact with a road surface. A bead portion is a portion of the tire that is fitted to a rim. A sidewall portion is a portion of the tire that extends between the tread portion and the bead portion. The tire includes a tread portion, a pair of bead portions, and a pair of sidewall portions as portions thereof.

In the present disclosure, a complex elastic modulus of a component formed from a crosslinked rubber, from among the components included in the tire, is measured according to the standards of JIS K6394. The measurement conditions are as follows.

Initial strain=10%
Dynamic strain=±1%
Frequency=10 Hz
Mode=stretch mode
Temperature=70° C.

In this measurement, a test piece (a length of 40 mm×a width of 4 mm×a thickness of 1 mm) is sampled from the tire. The length direction of the test piece is caused to coincide with the circumferential direction of the tire. When a test piece cannot be sampled from the tire, a test piece is sampled from a sheet-shaped crosslinked rubber (hereinafter, also referred to as a rubber sheet) obtained by pressurizing and heating a rubber composition, which is used for forming the component to be measured, at a temperature of 170° C. for 12 minutes.

In the present disclosure, the complex elastic modulus is represented as a complex elastic modulus at 70° C.

Outline of Embodiments of the Present Disclosure

[Configuration 1]

A heavy duty tire according to an aspect of the present disclosure includes: a pair of beads; a carcass extending on and between the pair of beads; a pair of chafers each configured to come into contact with a rim; a pair of steel reinforcing layers each located between the bead and the chafer; a pair of fiber reinforcing layers each located between the steel reinforcing layer and the chafer; and a tag member including an RFID tag, wherein each of the beads includes a core and an apex located radially outward of the core, the carcass includes a carcass ply, the carcass ply includes a ply body extending between the pair of beads and a pair of turned-up portions each connected to the ply body and turned up around the bead, the steel reinforcing layer includes a steel cord, the fiber reinforcing layer includes an organic fiber cord, the steel reinforcing layer is placed so as to wrap a radially inner portion of the bead from a radially inner side of the turned-up portion, an inner end and an outer end of the steel reinforcing layer are located between an end of the turned-up portion and the core in a radial direction, an inner end of the fiber reinforcing layer is located radially inward of the inner end of the steel reinforcing layer, an outer end of the fiber reinforcing layer is located between the end of the turned-up portion and an outer end of the apex in the radial direction, the fiber reinforcing layer includes a first reinforcing ply and a second reinforcing ply, an inner end of the first reinforcing ply is the inner end of the fiber reinforcing layer, an outer end of the second reinforcing ply is the outer end of the fiber reinforcing layer, the tag member is in contact with the apex on a radially outer side of the end of the turned-up portion, the RFID tag is located between the end of the turned-up portion and the outer end of the apex in the radial direction, and the outer end of the second reinforcing ply is located radially outward of an outer end of the first reinforcing ply.

By forming the tire as described above, the RFID tag is placed in the bead portion where the degree of bending is small. This placement contributes to reduction of the risk of damage to the RFID tag. The apex is located between the carcass ply and the RFID tag. The RFID tag is placed so as to be spaced apart from the carcass ply. Even if the carcass cord included in the carcass ply is a steel cord, radio waves are less likely to be disturbed. A good communication environment is formed between the RFID tag and a communication device (not shown). Writing of data to the RFID tag and reading of data recorded in the RFID tag are accurately performed.

In the tire, the outer ends of the two reinforcing plies included in the fiber reinforcing layer, that is, the outer end of the first reinforcing ply and the outer end of the second reinforcing ply, are located on the axially outer side of the apex. Moreover, the RFID tag is also placed on the axially outer side of the apex. Therefore, there is a concern that damage starting from the outer end of the reinforcing ply or the RFID tag may occur depending on the state of the placement of the two reinforcing plies. Damage to the RFID tag may also occur.

However, in the tire, the outer end of the second reinforcing ply is located so as to be spaced apart from the outer end of the first reinforcing ply without coinciding with the outer end of the first reinforcing ply. Therefore, concentration of strain on these outer ends is suppressed. The fiber reinforcing layer increases the stiffness of the bead portion, so that deformation of the bead portion when a load is applied to the bead portion is also suppressed. Therefore, strain is also less likely to be concentrated on the RFID tag. In the tire, the influence of providing the fiber reinforcing layer and the RFID tag on the axially outer side of the apex, on durability, is suppressed. The risk of damage to the RFID tag is also reduced.

The tire can achieve formation of a good communication environment and reduction of the risk of damage to the RFID tag while suppressing influence on durability.

[Configuration 2]

Preferably, in the tire described in [Configuration 1] above, the outer end of the apex is located radially inward of a maximum width position of the tire.

By forming the tire as described above, the RFID tag is placed radially inward of the maximum width position PW. In the tire, concentration of strain on the RFID tag is suppressed, so that occurrence of damage due to the presence of the RFID tag is suppressed. Occurrence of damage to the RFID tag is also suppressed. With the tire, good durability is maintained, and the risk of damage to the RFID tag is also reduced.

[Configuration 3]

Preferably, in the tire described in [Configuration 1] or [Configuration 2] above, the outer end of the first reinforcing ply is located radially outward of the end of the turned-up portion.

By forming the tire as described above, the end of the turned-up portion, the outer end of the first reinforcing ply, and the outer end of the second reinforcing ply are located in this order in the radial direction in a distributed manner. In the tire, concentration of strain when a load is applied to the bead portion is effectively suppressed. Concentration of strain on the RFID tag is also suppressed, so that the risk of damage to the RFID tag is further reduced. With the tire, good durability is maintained, and the risk of damage to the RFID tag is also reduced.

[Configuration 4]

More preferably, in the tire described in [Configuration 3] above, a distance in the radial direction from the outer end of the first reinforcing ply to the end of the turned-up portion is not less than 5.0 mm and not greater than 15 mm.

By forming the tire as described above, concentration of strain on the outer end of the first reinforcing ply and the end of the turned-up portion is effectively suppressed. The interval between the outer end of the first reinforcing ply and the end of the turned-up portion is appropriately maintained, so that the fiber reinforcing layer and the turned-up portion effectively increase the stiffness of the bead portion. Deformation of the bead portion when a load is applied to the bead portion is effectively suppressed, so that concentration of strain is less likely to be concentrated on the RFID tag. With the tire, good durability is maintained, and the risk of damage to the RFID tag is effectively reduced.

[Configuration 5]

Preferably, in the tire described in any one of [Configuration 1] to [Configuration 4] above, a ratio of a radial height of the outer end of the apex to a radial height of the outer end of the fiber reinforcing layer is not less than 1.15 and not greater than 1.80.

By forming the tire as described above, a space for placing the tag member can be ensured in consideration of the influence of the apex on bending of the tire. The tire allows the RFID tag to be placed at a position at which interference with the outer end of the fiber reinforcing layer is less likely to occur. Therefore, strain is less likely to be concentrated on the RFID tag. In the tire, the risk of damage to the RFID tag is effectively reduced while good ride comfort is maintained.

[Configuration 6]

Preferably, in the tire described in any one of [Configuration 1] to [Configuration 5] above, a ratio of a radial height of an outer end of the chafer to the radial height of the outer end of the fiber reinforcing layer is not less than 0.70 and not greater than 1.20.

By forming the tire as described above, the chafer is inhibited from protruding from the fiber reinforcing layer. Therefore, even if the chafer interferes with the tag member, occurrence of creases is suppressed. The stiffness of the bead portion is appropriately maintained, so that deformation of the bead portion when a load is applied to the bead portion is suppressed. Concentration of strain on the outer end of the fiber reinforcing layer and the RFID tag is suppressed, so that, in the tire, influence on durability is suppressed, and the risk of damage to the RFID tag is also reduced.

[Configuration 7]

Preferably, in the tire described in any one of [Configuration 1] to [Configuration 6] above, a distance in the radial direction from the outer end of the first reinforcing ply to the outer end of the second reinforcing ply is not less than 5.0 mm and not greater than 15 mm.

By forming the tire as described above, concentration of strain on the outer end of the first reinforcing ply and the outer end of the second reinforcing ply is suppressed. Furthermore, the stiffness of a radially outer portion of the fiber reinforcing layer is appropriately maintained, so that the fiber reinforcing layer can effectively increase the stiffness of the bead portion. Deformation of the bead portion is effectively suppressed, so that strain is less likely to be concentrated on the RFID tag. With the tire, good durability is maintained, and the risk of damage to the RFID tag is effectively reduced.

[Configuration 8]

Preferably, in the tire described in any one of [Configuration 1] to [Configuration 7] above, the RFID tag is located radially outward of the outer end of the first reinforcing ply.

By forming the tire as described above, the RFID tag is placed so as to be spaced apart from the end of the turned-up portion. Radio waves are less likely to be disturbed, so that a good communication environment is formed between the RFID tag and a communication device (not shown).

[Configuration 9]

Preferably, in the tire described in [Configuration 1] above, the RFID tag is located radially outward of the outer end of the fiber reinforcing layer.

By forming the tire as described above, the RFID tag is inhibited from interfering with the outer end of the fiber reinforcing layer. In the tire, strain is less likely to be concentrated on the RFID tag and the outer end of the fiber reinforcing layer. In the tire, the influence of the fiber reinforcing layer and the RFID tag on durability is effectively suppressed. The risk of damage to the RFID tag is further reduced.

Details of Embodiments of the Present Disclosure

FIG. 1 shows a part of a heavy duty tire 2 (hereinafter, also referred to simply as "tire 2") according to an embodiment of the present disclosure. The tire 2 is mounted to a vehicle such as a truck and a bus.

In FIG. 1, the tire 2 is fitted on a rim R (normal rim).

FIG. 1 shows a part of a cross-section (hereinafter, meridian cross-section) of the tire 2 along a plane including the rotation axis of the tire 2. In FIG. 1, the right-left direction is the axial direction of the tire 2, and the up-down direction is the radial direction of the tire 2. The direction perpendicular to the surface of the drawing sheet of FIG. 1 is the circumferential direction of the tire 2.

Figure 2:
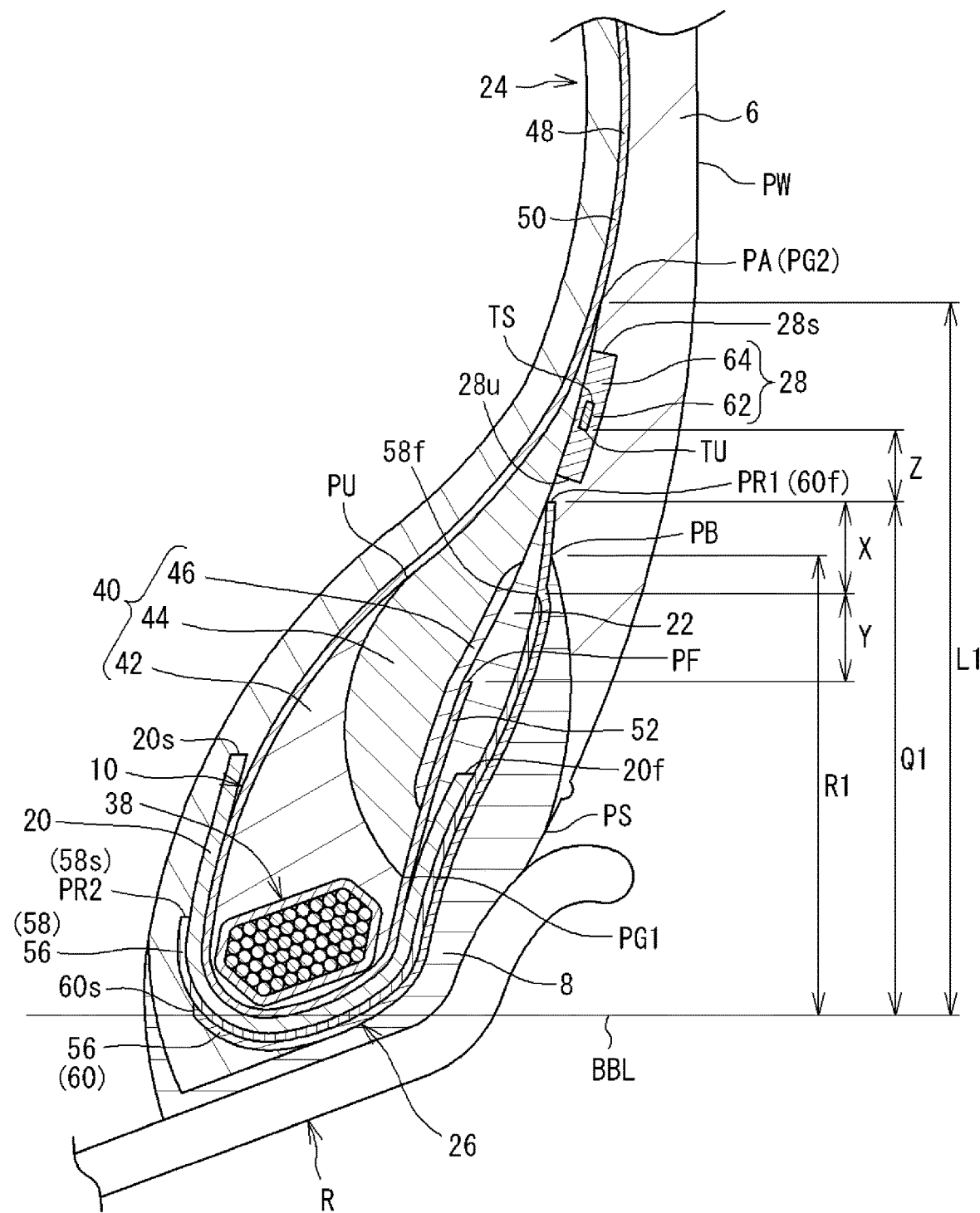
FIG. 2 is a cross-sectional view showing a part of the tire in FIG. 1.

FIG. 2 shows a part of the cross-section shown in FIG. 1. FIG. 2 shows a bead portion of the tire 2.

In FIG. 1, an alternate long and short dash line CL extending in the radial direction represents the equator plane of the tire 2. In FIG. 1 and FIG. 2, a solid line BBL extending in the axial direction is a bead base line. The bead base line BBL is a line that defines the rim diameter (see JATMA or the like) of the rim R.

The tire 2 includes a tread 4, a pair of sidewalls 6, a pair of chafers 8, a pair of beads 10, a carcass 12, a belt 14, a pair of cushion layers 16, a strip layer 18, a pair of steel reinforcing layers 20, a pair of interlayer strips 22, an inner liner 24, a pair of fiber reinforcing layers 26, and a tag member 28.

The tread 4 is located radially outward of the carcass 12. The tread 4 comes into contact with a road surface at a tread surface 30 thereof. Grooves 32 are formed on the tread 4.

The tread 4 includes a base portion 34 and a cap portion 36 located radially outward of the base portion 34. The base portion 34 is formed from a crosslinked rubber that has low heat generation properties. The cap portion 36 is formed from a crosslinked rubber for which wear resistance and grip performance are taken into consideration. The cap portion 36 includes the tread surface 30.

In FIG. 1, a position indicated by reference sign PC corresponds to an equator. The equator PC is the point of intersection of the tread surface 30 and the equator plane CL. In the case where the groove 32 is located on the equator plane CL as in the tire 2, the equator PC is specified on the basis of a virtual tread surface obtained on the assumption that the groove 32 is not present thereon.

The distance in the radial direction, from the bead base line BBL to the equator PC, obtained in the tire 2 in the normal state is the cross-sectional height (see JATMA or the like) of the tire 2.

Each sidewall 6 is connected to an end of the tread 4. The sidewall 6 is located radially inward of the tread 4. The sidewall 6 is located axially outward of the carcass 12. A position indicated by reference sign PS is an inner end of the sidewall 6.

The sidewall 6 is formed from a crosslinked rubber for which cut resistance is taken into consideration. The complex elastic modulus of the sidewall 6 is not less than 2.0 MPa and not greater than 6.0 MPa.

A position indicated by reference sign PW is an axially outer end (hereinafter, outer end PW) of the tire 2. In the case where decorations such as patterns and letters are present on the outer surface of the tire 2, the outer end PW is specified on the basis of a virtual outer surface obtained on the assumption that the decorations are not present thereon. The tire 2 has a maximum width at the outer end PW.

In the present disclosure, the outer end PW obtained in the tire 2 in the normal state is also referred to as maximum width position. The distance in the axial direction, from a first outer end PW to a second outer end PW (not shown), obtained in the tire 2 of the normal state is the cross-sectional width (see JATMA or the like) of the tire 2.

In FIG. 1, a length indicated by reference sign H is the distance in the radial direction from the bead base line BBL to the maximum width position PW. The distance H in the radial direction is also referred to as radial height of the maximum width position PW.

In the tire 2 in the normal state, the ratio of the radial height H of the maximum width position PW to the cross-sectional height is not less than 0.40 and not greater than 0.60.

Each chafer 8 is located radially inward of the sidewall 6. The chafer 8 comes into contact with the rim R. A position indicated by reference sign PB is an outer end of the chafer 8.

The chafer 8 is formed from a crosslinked rubber for which wear resistance is taken into consideration. The complex elastic modulus of the chafer 8 is not less than 10 MPa and not greater than 15 MPa. The chafer 8 is harder than the sidewall 6.

Each bead 10 is located axially inward of the chafer 8. The bead 10 is located radially inward of the sidewall 6. The bead 10 includes a core 38 and an apex 40.

The core 38 extends in the circumferential direction. The core 38 includes a wound wire made of steel. The core 38 has a substantially hexagonal cross-sectional shape.

The apex 40 is located radially outward of the core 38. The apex 40 extends radially outward from the core 38. The apex 40 is tapered outward. An outer end PA of the apex 40 is located radially outward of the outer end PB of the chafer 8.

The apex 40 includes an inner apex 42 and an outer apex 44. The inner apex 42 is located radially outward of the core 38. The outer apex 44 is located radially outward of the inner apex 42.

The inner apex 42 is tapered outward. The inner apex 42 is formed from a hard crosslinked rubber. The complex elastic modulus of the inner apex 42 is not less than 60 MPa and not greater than 90 MPa.

The outer apex 44 is thick around an outer end PU of the inner apex 42. The outer apex 44 is tapered inward and tapered outward from the thick portion thereof.

An inner end PG1 of the outer apex 44 is located near the core 38. An outer end PG2 of the outer apex 44 is also the outer end PA of the apex 40.

The outer apex 44 is formed from a crosslinked rubber. The outer apex 44 is more flexible than the inner apex 42. The complex elastic modulus of the outer apex 44 is not less than 3.0 MPa and not greater than 6.0 MPa.

The outer apex 44 has stiffness substantially equal to the stiffness of the sidewall 6, or is harder than the sidewall 6.

The outer apex 44 is more flexible than the chafer 8.

The apex 40 of the tire 2 further includes an edge strip 46. The edge strip 46 is located axially outward of the outer apex 44 and forms a part of the outer surface of the apex 40. The edge strip 46 is located between an outer end PR1 of the fiber reinforcing layer 26 (or the outer end PB of the chafer 8) and the inner end PG1 of the outer apex 44.

The edge strip 46 is formed from a crosslinked rubber. The edge strip 46 is more flexible than the chafer 8 and is harder than the outer apex 44. The complex elastic modulus of the edge strip 46 is not less than 7.0 MPa and not greater than 12 MPa.

The carcass 12 is located inward of the tread 4, the pair of sidewalls 6, and the pair of chafers 8. The carcass 12 extends on and between the pair of beads 10. The carcass 12 of the tire 2 has a radial structure.

The carcass 12 includes at least one carcass ply 48. The carcass 12 of the tire 2 is composed of one carcass ply 48. The carcass ply 48 is turned up around the beads 10.

The carcass ply 48 has a ply body 50 and a pair of turned-up portions 52. The ply body 50 extends between the pair of beads 10, that is, between a first bead 10 and a second bead 10 (not shown). Each turned-up portion 52 is connected to the ply body 50 and turned up around the bead 10. The turned-up portion 52 of the tire 2 is turned up around the bead 10 from the inner side toward the outer side in the axial direction. An end PF of the turned-up portion 52 is located radially inward of the outer end PB of the chafer 8. The bead 10 is interposed between the ply body 50 and the turned-up portion 52.

The carcass ply 48 includes a large number of carcass cords aligned with each other, which are not shown. These carcass cords are covered with a topping rubber. Each carcass cord intersects the equator plane CL. The material of the carcass cords is steel. In other words, steel cords are used as the carcass cords.

In FIG. 1, a length indicated by reference sign N is the distance in the radial direction from the bead base line BBL to the end PF of the turned-up portion 52. The distance N in the radial direction is also referred to as radial height of the end PF of the turned-up portion 52.

In the tire 2, the ratio (N/H) of the radial height N of the end PF of the turned-up portion 52 to the radial height H of the maximum width position PW is not less than 0.25 and not greater than 0.45.

The belt 14 includes four belt plies 54. The four belt plies 54 are a first belt ply 54A, a second belt ply 54B, a third belt ply 54C, and a fourth belt ply 54D. These belt plies 54 are aligned in the radial direction.

In the tire 2, the second belt ply 54B has a largest width, and the fourth belt ply 54D has a smallest width.

Each belt ply 54 includes a large number of belt cords aligned with each other, which are not shown. Each belt cord is tilted relative to the equator plane CL. The material of the belt cords is steel. In other words, steel cords are used as the belt cords.

Each cushion layer 16 is located between the belt 14 and the carcass 12 at the end of the belt 14. The cushion layer 16 is formed from a flexible crosslinked rubber.

The strip layer 18 is located between the carcass 12 and the belt 14 on the radially inner side of the tread 4. In the axial direction, the strip layer 18 is located between a first cushion layer 16 and a second cushion layer 16. The strip layer 18 is formed from a crosslinked rubber.

Each steel reinforcing layer 20 is located in the bead portion. The steel reinforcing layer 20 is located between the bead 10 and the chafer 8. The steel reinforcing layer 20 is located between the carcass 12 and the fiber reinforcing layer 26. The steel reinforcing layer 20 is turned up around the bead 10. The steel reinforcing layer 20 is placed so as to wrap a radially inner portion of the bead 10 from the radially inner side of the turned-up portion 52. An inner end 20s and an outer end 20f of the steel reinforcing layer 20 are located between the end PF of the turned-up portion 52 and the core 38 in the radial direction.

The steel reinforcing layer 20 includes a large number of first filler cords aligned with each other, which are not shown. The material of the first filler cords is steel. The steel reinforcing layer 20 includes steel cords. In the steel reinforcing layer 20, the steel cords are covered with a topping rubber.

The outer end 20f of the steel reinforcing layer 20 is located between the turned-up portion 52 and the fiber reinforcing layer 26 in the axial direction. The outer end 20f is located radially inward of the end PF of the turned-up portion 52. The inner end 20s is located between the inner liner 24 and the ply body 50 in the axial direction. It is sufficient that the position in the radial direction of the inner end 20s substantially coincides with that of the outer end 20f, and the inner end 20s may be located radially outward of the outer end 20f or may be located radially inward of the outer end 20f.

Each interlayer strip 22 is located between the fiber reinforcing layer 26 and the apex 40 in the axial direction. The interlayer strip 22 covers the end PF of the turned-up portion 52 and the outer end 20f of the steel reinforcing layer 20.

The interlayer strip 22 is in contact with the apex 40 on the radially outer side of the end PF of the turned-up portion 52. In other words, the contact surface between the interlayer strip 22 and the apex 40 forms a part of the outer surface of the apex 40 (or the inner surface of the interlayer strip 22).

The interlayer strip 22 is in contact with the fiber reinforcing layer 26 on the radially outer side of the outer end 20f of the steel reinforcing layer 20. In other words, the contact surface between the interlayer strip 22 and the fiber reinforcing layer 26 forms a part of the inner surface of the fiber reinforcing layer 26 (or the outer surface of the interlayer strip 22).

The interlayer strip 22 is formed from a crosslinked rubber. The interlayer strip 22 is harder than the sidewall 6 and is more flexible than the chafer 8. The complex elastic modulus of the interlayer strip 22 is not less than 7.0 MPa and not greater than 12 MPa.

The inner liner 24 is located inward of the carcass 12. The inner liner 24 is joined to the inner surface of the carcass 12 via an insulation (not shown) formed from a crosslinked rubber. The inner liner 24 forms an inner surface of the tire 2. The inner liner 24 is formed from a crosslinked rubber that has an excellent air blocking property.

Each fiber reinforcing layer 26 is located in the bead portion. The fiber reinforcing layer 26 is located between the steel reinforcing layer 20 and the chafer 8.

An inner end PR2 of the fiber reinforcing layer 26 is located between the inner liner 24 and the steel reinforcing layer 20 on the axially inner side of the ply body 50. The inner end PR2 of the fiber reinforcing layer 26 is located radially inward of the inner end 20s of the steel reinforcing layer 20. The inner end PR2 of the fiber reinforcing layer 26 is located radially inward of the inner end PG1 of the outer apex 44.

The outer end PR1 of the fiber reinforcing layer 26 is located radially outward of the inner end PR2 thereof. The outer end PR1 of the fiber reinforcing layer 26 is located between the end PF of the turned-up portion 52 and the outer end PA of the apex 40 in the radial direction.

An axially outer portion of the fiber reinforcing layer 26 is located between the steel reinforcing layer 20 and the interlayer strip 22, and the chafer 8 in the axial direction. This axially outer portion is in contact with the chafer 8. The contact surface between the axially outer portion and the chafer 8 forms a part of the outer surface of the fiber reinforcing layer 26 (or the inner surface of the chafer 8).

The fiber reinforcing layer 26 includes two reinforcing plies 56, that is, a first reinforcing ply 58 and a second reinforcing ply 60. In the tire 2, out of the two reinforcing plies 56, the first reinforcing ply 58 is located on the bead 10 side, and the second reinforcing ply 60 is located on the outer surface side of the tire 2. The second reinforcing ply 60 is stacked on the first reinforcing ply 58. The contact surface between the first reinforcing ply 58 and the second reinforcing ply 60 forms a part of the outer surface of the first reinforcing ply 58 (or the inner surface of the second reinforcing ply 60).

An inner end 58s of the first reinforcing ply 58 is the inner end PR2 of the fiber reinforcing layer 26. An outer end 60f of the second reinforcing ply 60 is the outer end PR1 of the fiber reinforcing layer 26.

Each reinforcing ply 56 includes a large number of second filler cords aligned with each other, which are not shown. The second filler cords are cords formed form an organic fiber, that is, organic fiber cords. The organic fiber is preferably a nylon fiber. The two reinforcing plies 56 included in the fiber reinforcing layer 26 each include organic fiber cords, and the organic fiber cords are covered with a topping rubber.

In the tire 2, the first reinforcing ply 58 and the second reinforcing ply 60 are overlaid on each other such that the organic fiber cords included in the first reinforcing ply 58 intersect the organic fiber cords included in the second reinforcing ply 60.

The tag member 28 is located axially outward of the bead 10. In the tire 2, the tag member 28 is provided only on the side of a first sidewall 6. The tag member 28 may be provided on each of the side of the first sidewall 6 and the side of a second sidewall 6. From the viewpoint of reducing the risk of damage, the tag member 28 is preferably provided on the side of the first sidewall 6 out of the pair of sidewalls 6.

Figure 3:
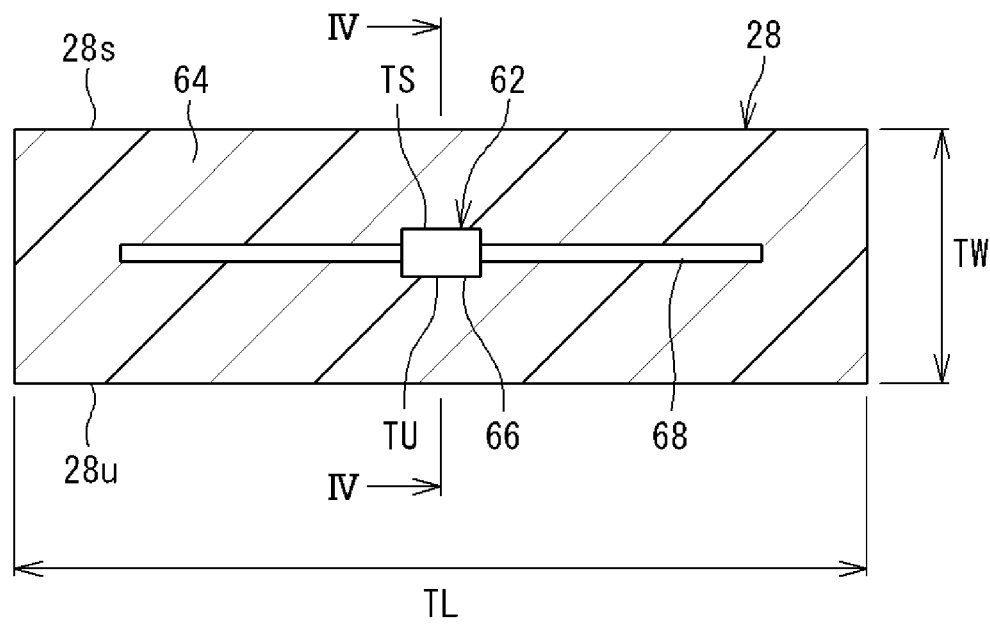
FIG. 3 is a plan view of a tag member.
Figure 4:
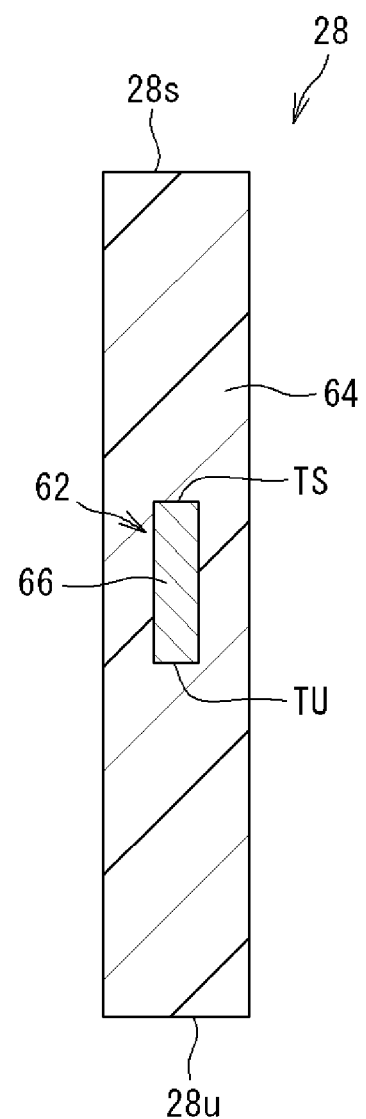
FIG. 4 is a cross-sectional view taken along a line IV-IV in FIG. 3.

FIG. 3 is a plan view of the tag member 28. FIG. 4 is a cross-sectional view taken along a line IV-IV in FIG. 3.

The tag member 28 has a plate shape. The tag member 28 is long in a length direction thereof and short in a width direction thereof. As shown in FIG. 1, in the tire 2, the tag member 28 is placed such that a first end 28s in the width direction thereof is located on the radially outer side in the tire 2 and a second end 28u in the width direction thereof is located on the radially inner side in the tire 2. In the tire 2, the first end 28s is also referred to as outer end, and the second end 28u is also referred to as inner end.

The tag member 28 includes an RFID tag 62. In FIG. 3, for convenience of description, the RFID tag 62 is shown by a solid line, but the entirety thereof is covered with a protector 64. The tag member 28 includes the RFID tag 62 and the protector 64. The RFID tag 62 is located at the center of the tag member 28. The protector 64 is formed from a crosslinked rubber. The protector 64 has stiffness substantially equal to the stiffness of the outer apex 44. In the tire 2, formation of a good communication environment is considered, and a crosslinked rubber having high electrical resistance is used for the protector 64. The protector 64 is formed from a rubber that has high insulation properties.

Although not described in detail, the RFID tag 62 is a small and lightweight electronic component that includes: a semiconductor chip 66 obtained by making a transmitter/receiver circuit, a control circuit, a memory, etc., into a chip; and an antenna 68. Upon receiving interrogation radio waves, the RFID tag 62 uses the radio waves as electrical energy and transmits various data in the memory as response radio waves. The RFID tag 62 is a type of passive radio frequency identification transponder.

The tag member 28 is a plate-shaped member in which the RFID tag 62 is covered with a crosslinked rubber. From the viewpoint of reducing the risk of damage to the RFID tag 62 and forming a good communication environment, the thickness of the tag member 28 in the tire 2 is preferably not less than 1.0 mm and not greater than 2.5 mm. The thickness of the tag member 28 in the tire 2 is represented as the maximum thickness of the tag member 28 at the semiconductor chip 66 of the RFID tag 62.

A length TL of the tag member 28 before embedding in the tire 2 is not less than 60 mm and not greater than 80 mm. A width TW thereof is not less than 10 mm and not greater than 20 mm.

In FIG. 2, a position indicated by reference sign TU is a radially inner end of the RFID tag 62 (specifically, the semiconductor chip 66). A position indicated by reference sign TS is a radially outer end of the semiconductor chip 66, that is, a radially outer end of the RFID tag 62.

In the present disclosure, the case where the inner end TU of the RFID tag 62 in the tire 2 is located radially outward of a position serving as a reference (hereinafter, reference position) is the case where the RFID tag 62 is located radially outward of the reference position. The case where the outer end TS of the RFID tag 62 in the tire 2 is located radially inward of the reference position is the case where the RFID tag 62 is located radially inward of the reference position.

In the tire 2, the tag member 28 is located axially outward of the apex 40 on the radially outer side of the end PF of the turned-up portion 52. The tag member 28 is in contact with the apex 40. The boundary between the tag member 28 and the apex 40 forms a part of the outer surface of the apex 40. More specifically, the tag member 28 is located axially outward of the outer apex 44, and is in contact with the outer apex 44. The boundary between the tag member 28 and the outer apex 44 forms a part of the outer surface of the outer apex 44.

The RFID tag 62 is located between the end PF of the turned-up portion 52 and the outer end PA of the apex 40 in the radial direction.

The RFID tag 62 of the tire 2 is placed in the bead portion where the degree of bending is small. This placement contributes to reduction of the risk of damage to the RFID tag 62.

In the tire 2, the apex 40 is located between the carcass ply 48 and the RFID tag 62. The RFID tag 62 is placed so as to be spaced apart from the carcass ply 48 including the carcass cords which are metal components. Radio waves are less likely to be disturbed, so that a good communication environment is formed between the RFID tag 62 and a communication device (not shown). Writing of data to the RFID tag 62 and reading of data recorded in the RFID tag 62 are accurately performed.

As described above, in the bead portion of the tire 2, the fiber reinforcing layer 26 is provided in addition to the steel reinforcing layer 20. Therefore, outer ends of the two reinforcing plies 56 included in the fiber reinforcing layer 26, that is, an outer end 58f of the first reinforcing ply 58 and the outer end 60f of the second reinforcing ply 60, are located on the axially outer side of the apex 40. Moreover, the RFID tag 62 is also placed on the axially outer side of the apex 40. Therefore, there is a concern that damage starting from the outer end of the reinforcing ply 56 or the RFID tag 62 may occur depending on the state of the placement of the two reinforcing plies 56. Damage to the RFID tag 62 may also occur.

In the tire 2, the outer end 60f of the second reinforcing ply 60 is located radially outward of the outer end 58f of the first reinforcing ply 58. The outer end 60f of the second reinforcing ply 60 is located so as to be spaced apart from the outer end 58f of the first reinforcing ply 58 without coinciding with the outer end 58f of the first reinforcing ply 58, so that concentration of strain on the outer end 58f and the outer end 60f is suppressed. The fiber reinforcing layer 26 increases the stiffness of the bead portion, so that deformation of the bead portion when a load is applied to the bead portion is also suppressed. Therefore, strain is also less likely to be concentrated on the RFID tag 62. In the tire 2, the influence of providing the fiber reinforcing layer 26 and the RFID tag 62 on the axially outer side of the apex 40, on durability, is effectively suppressed. The risk of damage to the RFID tag 62 is also reduced.

The tire 2 can achieve formation of a good communication environment and reduction of the risk of damage to the RFID tag 62 while suppressing influence on durability.

In FIG. 2, a length indicated by reference sign X is the distance in the radial direction from the outer end 58*f* of the first reinforcing ply 58 to the outer end 60*f* of the second reinforcing ply 60.

In the tire 2, the distance X in the radial direction is preferably not less than 5.0 mm and not greater than 15 mm.

When the distance X in the radial direction is set to be not less than 5.0 mm, the outer end 58*f* of the first reinforcing ply 58 and the outer end 60*f* of the second reinforcing ply 60 are located at an appropriate interval therebetween. Concentration of strain on the outer end 58*f* and the outer end 60*f* is suppressed. With the tire 2, good durability is maintained. From this viewpoint, the distance X in the radial direction is more preferably not less than 8.0 mm.

When the distance X in the radial direction is set to be not greater than 15 mm, the interval between the outer end 58*f* of the first reinforcing ply 58 and the outer end 60*f* of the second reinforcing ply 60 is appropriately maintained. The stiffness of a radially outer portion of the fiber reinforcing layer 26 is appropriately maintained. The fiber reinforcing layer 26 effectively increases the stiffness of the bead portion. Deformation of the bead portion when a load is applied to the bead portion is effectively suppressed, so that strain is less likely to be concentrated on the RFID tag 62. In the tire 2, the risk of damage to the RFID tag 62 is effectively reduced. From this viewpoint, the distance X in the radial direction is more preferably not greater than 12 mm.

In the tire 2, the outer end PA of the apex 40 is located radially inward of the maximum width position PW. As described above, the RFID tag 62 is located between the end PF of the turned-up portion 52 and the outer end PA of the apex 40 in the radial direction. Therefore, the entirety of the RFID tag 62 is located radially inward of the maximum width position PW. In the tire 2, the RFID tag 62 is not placed at the maximum width position PW where large strain is generated. Concentration of strain on the RFID tag 62 is suppressed, so that occurrence of damage due to the presence of the RFID tag 62 is suppressed. Occurrence of damage to the RFID tag 62 is also suppressed. With the tire 2, good durability is maintained, and the risk of damage to the RFID tag 62 can also be reduced. From this viewpoint, the outer end PA of the apex 40 is preferably located radially inward of the maximum width position PW.

In FIG. 2, a length indicated by reference sign L1 is the distance in the radial direction from the bead base line BBL to the outer end PG2 of the outer apex 44. The distance L1 in the radial direction is also referred to as radial height of the outer end PG2 of the outer apex 44. As described above, the outer end PG2 of the outer apex 44 is also the outer end PA of the apex 40. The distance L1 in the radial direction is also referred to as radial height of the outer end PA of the apex 40.

In the tire 2, from the viewpoint of maintaining good durability, the ratio (L1/H) of the radial height L1 of the outer end PA of the apex 40 to the radial height H of the maximum width position PW is preferably not greater than 0.95. From the viewpoint that the apex 40 can effectively contribute to increasing the stiffness of the bead portion, the ratio (L1/H) is preferably not less than 0.55.

In the tire 2, the outer end TS of the RFID tag 62 is located radially inward of the outer end PA of the apex 40. Accordingly, the RFID tag 62 is placed sufficiently away from the maximum width position PW. Therefore, concentration of strain on the RFID tag 62 is effectively suppressed. In the tire 2, not only damage starting from the RFID tag 62 but also damage to the RFID tag 62 is effectively suppressed. With the tire 2, good durability is maintained, and the risk of damage to the RFID tag 62 is also reduced. From this viewpoint, the RFID tag 62 (specifically, the outer end TS of the RFID tag 62) is preferably located radially inward of the outer end PA of the apex 40. In this case, from the viewpoint of being able to effectively suppress concentration of strain on the RFID tag 62, the outer end 28*s* of the tag member 28 is more preferably located radially inward of the outer end PA of the apex 40.

In the tire 2, the outer end 58*f* of the first reinforcing ply 58 is located radially outward of the end PF of the turned-up portion 52. As described above, the outer end 60*f* of the second reinforcing ply 60 is located radially outward of the outer end 58*f* of the first reinforcing ply 58. In the tire 2, the end PF of the turned-up portion 52, the outer end 58*f* of the first reinforcing ply 58, and the outer end 60*f* of the second reinforcing ply 60 are located in this order in the radial direction in a distributed manner. In the tire 2, concentration of strain when a load is applied to the bead portion is effectively suppressed. Concentration of strain on the RFID tag 62 is also suppressed, so that the risk of damage to the RFID tag 62 is further reduced. With the tire 2, good durability is maintained, and the risk of damage to the RFID tag 62 is also reduced. From this viewpoint, the outer end 58*f* of the first reinforcing ply 58 is preferably located radially outward of the end PF of the turned-up portion 52.

In FIG. 2, a length indicated by reference sign Y is the distance in the radial direction from the outer end 58*f* of the first reinforcing ply 58 to the end PF of the turned-up portion 52.

In the tire 2, the distance Y in the radial direction is preferably not less than 5.0 mm and not greater than 15 mm.

When the distance Y in the radial direction is set to be not less than 5.0 mm, the outer end 58*f* of the first reinforcing ply 58 and the end PF of the turned-up portion 52 are located at an appropriate interval therebetween. Concentration of strain on the outer end 58*f* and the end PF is effectively suppressed. With the tire 2, good durability is maintained. From this viewpoint, the distance Y in the radial direction is more preferably not less than 8.0 mm.

When the distance Y in the radial direction is set to be not greater than 15 mm, the interval between the outer end 58*f* of the first reinforcing ply 58 and the end PF of the turned-up portion 52 is appropriately maintained. The fiber reinforcing layer 26 and the turned-up portion 52 effectively increase the stiffness of the bead portion. Deformation of the bead portion when a load is applied to the bead portion is effectively suppressed, so that strain is less likely to be concentrated on the RFID tag 62. In the tire 2, the risk of damage to the RFID tag 62 is effectively reduced. From this viewpoint, the distance Y in the radial direction is more preferably not greater than 12 mm.

In FIG. 2, a length indicated by reference sign Q1 is the distance in the radial direction from the bead base line BBL to the outer end PR1 of the fiber reinforcing layer 26. The distance Q1 in the radial direction is also referred to as radial height of the outer end PR1 of the fiber reinforcing layer 26. As described above, the outer end PR1 of the fiber reinforcing layer 26 is the outer end 60f of the second reinforcing ply 60. The distance Q1 in the radial direction is also the radial height of the outer end 60f of the second reinforcing ply 60.

In the tire 2, the ratio (L1/Q1) of the radial height L1 of the outer end PA of the apex 40 to the radial height Q1 of the outer end PR1 of the fiber reinforcing layer 26 is preferably not less than 1.15 and not greater than 1.80.

When the ratio (L1/Q1) is set to be not less than 1.15, a space for placing the tag member 28 is ensured. The tire 2 allows the RFID tag 62 to be placed at a position at which interference with the outer end PR1 of the fiber reinforcing layer 26 is less likely to occur. Therefore, strain is less likely to be concentrated on the RFID tag 62. In the tire 2, the risk of damage to the RFID tag 62 is effectively reduced. From this viewpoint, the ratio (L1/Q1) is more preferably not less than 1.30.

When the ratio (L1/Q1) is set to be not greater than 1.80, the influence of the apex 40 (specifically, the outer apex 44) on bending of the tire 2 is suppressed. With the tire 2, good ride comfort is maintained. From this viewpoint, the ratio (L1/Q1) is more preferably not greater than 1.60.

In FIG. 2, a length indicated by reference sign R1 is the distance in the radial direction from the bead base line BBL to the outer end PB of the chafer 8. The distance R1 in the radial direction is also referred to as radial height of the outer end PB of the chafer 8.

In FIG. 2, the outer end PB of the chafer 8 is located radially inward of the outer end PR1 of the fiber reinforcing layer 26. In the tire 2, the outer end PB may be located radially outward of the outer end PR1.

Meanwhile, the chafer 8 is a component extending radially outward from the rim R side. The outer end PB of the chafer 8 is a location where waving called creases is likely to occur in the manufacture of the tire 2. Therefore, if the radial height R1 of the outer end PB of the chafer 8 is excessively high with respect to the radial height Q1 of the outer end PR1 of the fiber reinforcing layer 26, there is a concern that creases may occur. On the other hand, if the radial height R1 is excessively low with respect to the radial height Q1, the stiffness of the bead portion may be decreased. In this case, there is a concern that the durability may be decreased or the risk of damage to the RFID tag 62 may be increased.

However, in the tire 2, in consideration of creases, durability, and the risk of damage to the RFID tag 62, the outer end PB of the chafer 8 is located with respect to the outer end PR1 of the fiber reinforcing layer 26. Specifically, the ratio (R1/Q1) of the radial height R1 of the outer end PB of the chafer 8 to the radial height Q1 of the outer end PR1 of the fiber reinforcing layer 26 is preferably not less than 0.70 and not greater than 1.20.

When the ratio (R1/Q1) is set to be not greater than 1.20, the chafer 8 is inhibited from protruding from the fiber reinforcing layer 26. Therefore, even if the chafer 8 interferes with the tag member 28, occurrence of creases is suppressed. From this viewpoint, the ratio (R1/Q1) is more preferably not greater than 1.10.

When the ratio (R1/Q1) is set to be not less than 0.70, the stiffness of the bead portion is appropriately maintained. Deformation of the bead portion when a load is applied to the bead portion is suppressed, so that concentration of strain on the outer end PR1 of the fiber reinforcing layer 26 and the RFID tag 62 is suppressed. In the tire 2, influence on durability is suppressed, and the risk of damage to the RFID tag 62 is also reduced. From this viewpoint, the ratio (R1/Q1) is more preferably not less than 0.80.

In the tire 2, the position TU of the RFID tag 62 is on the radially outer side of the outer end 58f of the first reinforcing ply 58. In other words, the RFID tag 62 is located radially outward of the outer end 58f of the first reinforcing ply 58. Accordingly, the RFID tag 62 is placed on the tread 4 side away from the end PF of the turned-up portion 52. Radio waves are less likely to be disturbed, so that a good communication environment is formed between the RFID tag 62 and a communication device (not shown). From this viewpoint, the RFID tag 62 is preferably located radially outward of the outer end 58f of the first reinforcing ply 58.

In the case where the RFID tag 62 is located radially outward of the outer end 58f of the first reinforcing ply 58, the outer end 28s of the tag member 28 may be located radially inward of the outer end PR1 of the fiber reinforcing layer 26, or the position of the outer end 28s of the tag member 28 may coincide with the position of the outer end PR1 of the fiber reinforcing layer 26 in the radial direction. The outer end 28s of the tag member 28 may be located radially outward of the outer end PR1 of the fiber reinforcing layer 26. From the viewpoint of being able to effectively suppress concentration of strain on the outer end PR1 of the fiber reinforcing layer 26, the outer end 28s of the tag member 28 is preferably located radially outward of the outer end PR1 of the fiber reinforcing layer 26.

In the tire 2, the position TU of the RFID tag 62 is on the radially outer side of the outer end PR1 of the fiber reinforcing layer 26. In other words, the RFID tag 62 is located radially outward of the outer end PR1 of the fiber reinforcing layer 26. Accordingly, the RFID tag 62 is placed on the tread 4 side away from the outer end PR1 of the fiber reinforcing layer 26. The RFID tag 62 is inhibited from interfering with the outer end PR1 of the fiber reinforcing layer 26. In the tire 2, strain is less likely to be concentrated on the RFID tag 62 and the outer end PR1 of the fiber reinforcing layer 26. In the tire 2, the influence of the fiber reinforcing layer 26 and the RFID tag 62 on durability is effectively suppressed. The risk of damage to the RFID tag 62 is further reduced. From this viewpoint, the RFID tag 62 is preferably located radially outward of the outer end PR1 of the fiber reinforcing layer 26.

In the case where the RFID tag 62 is located radially outward of the outer end PR1 of the fiber reinforcing layer 26, the inner end 28u of the tag member 28 may be located radially inward of the outer end PR1 of the fiber reinforcing layer 26, or the position of the inner end 28u of the tag member 28 may coincide with the position of the outer end PR1 of the fiber reinforcing layer 26 in the radial direction. The inner end 28u of the tag member 28 may be located radially outward of the outer end PR1 of the fiber reinforcing layer 26. From the viewpoint of being able to effectively suppress concentration of strain on the outer end PR1 of the fiber reinforcing layer 26, the inner end 28u of the tag member 28 is preferably located radially outward of the outer end PR1 of the fiber reinforcing layer 26.

In FIG. 2, a length indicated by reference sign Z is the distance in the radial direction from the outer end PR1 of the fiber reinforcing layer 26 to the inner end TU of the RFID tag 62.

In the tire 2, in the case where the RFID tag 62 is located radially outward of the outer end PR1 of the fiber reinforcing layer 26, the distance Z in the radial direction is preferably not less than 5.0 mm. Accordingly, the RFID tag 62 is placed at an appropriate distance from the outer end PR1 of the fiber reinforcing layer 26. In the tire 2, concentration of strain on the RFID tag 62 and the outer end PR1 of the fiber reinforcing layer 26 is effectively suppressed. With the tire 2, good durability is maintained, and the risk of damage to the RFID tag 62 is also reduced. From this viewpoint, the distance Z in the radial direction is more preferably not less than 8.0 mm. In the tire 2, a preferable upper limit of the distance Z in the radial direction is determined as appropriate according to the length of a zone from the outer end PR1 of the fiber reinforcing layer 26 to the outer end PA of the apex 40.

In the tire 2, the outer end PU of the inner apex 42 is located between the end PF of the turned-up portion 52 and the RFID tag 62 in the radial direction. Accordingly, the hard inner apex 42 effectively increases the stiffness of the bead portion. Strain applied to the RFID tag 62 is effectively reduced. The tire 2 can effectively reduce the risk of damage to the RFID tag 62. From this viewpoint, the outer end PU of the inner apex 42 is preferably located between the end PF of the turned-up portion 52 and the RFID tag 62 in the radial direction. In this case, from the viewpoint of being able to further reduce the risk of damage to the RFID tag 62, more preferably, the outer end PU of the inner apex 42 is located between the end PF of the turned-up portion 52 and the RFID tag 62 in the radial direction, and further, the outer end PU of the inner apex 42 is located between the end PF of the turned-up portion 52 and the outer end PR1 of the fiber reinforcing layer 26 in the radial direction.

As is obvious from the above description, according to the present invention, the heavy duty tire 2 that can achieve formation of a good communication environment and reduction of the risk of damage to the RFID tag 62 while suppressing influence on durability, is obtained.

EXAMPLES

The following will describe the present invention in further detail by means of examples, etc., but the present invention is not limited to these examples.

Examples 1 and 2 and Comparative Example 1

Heavy duty tires (tire size=315/80R22.5) having the basic structure shown in FIG. 1 and having specifications shown in Table 1 below were obtained.

The fiber reinforcing layer was composed of two reinforcing plies. As the second filler cords included in each reinforcing ply, organic fiber cords formed from a nylon fiber were used.

The radial height L1 of the outer end of the apex was set to 90 mm. The radial height R1 of the outer end of the chafer was set to 65 mm. The distance in the radial direction from the bead base line to the outer end of the first reinforcing ply was set to 52 mm. The distance Y in the radial direction from the outer end of the first reinforcing ply to the end of the turned-up portion was set to 10 mm.

The tag member was set so as to be in contact with the outer surface of the apex. In particular, the tag member was set in a zone, between the outer end of the outer apex and the end of the turned-up portion, where strain applied to the RFID tag was small and a good communication environment was formed.

Examples 1 and 2 and Comparative Example 1 were prepared by changing the position of the tag member, changing the position of the outer end of the second reinforcing ply, and adjusting the radial height Q1 of the outer end of the fiber reinforcing layer and the distance X in the radial direction from the outer end of the first reinforcing ply to the outer end of the second reinforcing ply as shown in Table 1 below.

In each case, the outer end of the tag member was located radially inward of the outer end of the apex.

In Example 1, the tag member was placed such that the entirety thereof was located between the outer end of the fiber reinforcing layer and the outer end of the apex. The fact that the RFID tag is located radially outward of the outer end of the fiber reinforcing layer is represented as "out" in the cell for position in Table 1.

In Example 2, the tag member was placed such that the RFID tag was located between the outer end of the first reinforcing ply and the outer end of the second reinforcing ply and the outer end of the tag member was located radially outward of the outer end of the fiber reinforcing layer. The RFID tag was located radially inward of the outer end of the fiber reinforcing layer, and thus this is represented as "in" in the cell for position in Table 1.

In Comparative Example 1, as in Example 1, the tag member was placed such that the entirety thereof was located between the outer end of the fiber reinforcing layer and the outer end of the apex. The position of the RFID tag with respect to the bead base line is the same as that in Example 1.

[Durability]

A test tire was fitted onto a rim (size=22.5×9.00) and inflated with air to adjust the internal pressure of the tire to a normal internal pressure. The tire was heated in an atmosphere of dry air adjusted to 110° C. for 3 days. The tire was cooled to room temperature, and then mounted to a drum tester. A load that was twice the normal load was applied to the tire, and the tire was caused to run on a drum (radius=1.7 m) at a speed of 40 km/h. The running distance was measured until damage to the bead portion occurred. The results are shown as indexes in Table 1 below. A higher value indicates that the durability is better. The acceptance criterion was defined as being able to run for 10,000 km or more. In Table 1, "NG" indicates that the running distance did not reach 10,000 km.

[Readability]

A test tire was fitted onto a rim (size=22.5×9.00) and inflated with air to adjust the internal pressure of the tire to a normal internal pressure. The tire was mounted to a drum tester. A load that was twice the normal load was applied to the tire, and the tire was caused to run on a drum (radius=1.7 m) at a speed of 40 km/h. After running for 10,000 km, whether or not reading of the RFID tag was possible was checked using a reading device. The results are shown in Table 1 below with "G" for the case where reading was possible and with "NG" for the case where reading was impossible. "-" indicates that the tire was damaged during running and it was impossible to perform readability evaluation.

TABLE 1

|  | Example 1 | Example 2 | Comparative Example 1 |
|---|---|---|---|
| Position | out | in | out |
| Q1 [mm] | 62 | 62 | 52 |
| X [mm] | 10 | 10 | 0 |
| Durability | 100 | 75 | NG |
| Readability | G | G | — |

As shown in Table 1, it is confirmed that, in each Example, it is possible to achieve formation of a good communication environment and reduction of the risk of damage to the RFID tag while suppressing influence on durability. From the evaluation results, advantages of the present invention are clear.

INDUSTRIAL APPLICABILITY

The above-described technology capable of achieving formation of a good communication environment and reduction of the risk of damage to an RFID tag while suppressing influence on durability can be applied to various tires.

REFERENCE SIGNS LIST 2 tire
4 tread
6 sidewall
8 chafer
10 bead
12 carcass
20 steel reinforcing layer
22 interlayer strip
26 fiber reinforcing layer
28 tag member
38 core
40 apex
42 inner apex
44 outer apex
46 edge strip
48 carcass ply
50 ply body
52 turned-up portion
56 reinforcing ply
58 first reinforcing ply
60 second reinforcing ply
62 tag
64 protector
66 semiconductor chip
68 antenna

The invention claimed is:

1. A heavy duty tire comprising:
a pair of beads;
a carcass extending on and between the pair of beads;
a pair of sidewalls located axially outward of the carcass;
a pair of chafers each configured to come into contact with a rim;
a pair of steel reinforcing layers each located between each of the beads and a corresponding chafer of the chafers;
a pair of fiber reinforcing layers each located between each of the steel reinforcing layers and a corresponding chafer of the chafers; and
a tag member including an RFID tag and a protector covering an entirety of the RFID tag,
wherein each of the beads includes a core and an apex located radially outward of the core,
each of the apexes includes an inner apex located radially outward of a corresponding core and an outer apex located radially outward of the inner apex,
the carcass includes a carcass ply,
the carcass ply includes a plurality of carcass cords aligned with each other,
the carcass cords are steel cords,
the carcass ply includes a ply body extending between the pair of beads and a pair of turned-up portions each connected to the ply body and turned up around a corresponding bead of the beads,
an outer end of one of the inner apexes is located between an end of a corresponding turned-up portion of the turned-up portions and the RFID tag in a radial direction,
each of the steel reinforcing layers includes a steel cord,
each of the fiber reinforcing layers includes an organic fiber cord,
each of the steel reinforcing layers is placed so as to wrap a radially inner portion of the corresponding bead from a radially inner side of the corresponding turned-up portion,
an inner end and an outer end of each of the steel reinforcing layers are located between an end of the corresponding turned-up portion and the corresponding core in the radial direction,
the inner end of each of the steel reinforcing layers is located radially outward of the outer end of corresponding steel reinforcing layer of the steel reinforcing layers,
an inner end of each of the fiber reinforcing layers is located radially inward of the inner end of the corresponding steel reinforcing layer,
an outer end of each of the fiber reinforcing layers is located between the end of the corresponding turned-up portion and an outer end of a corresponding apex in the radial direction,
each of the fiber reinforcing layers includes a first reinforcing ply and a second reinforcing ply,
an inner end of each of the first reinforcing plies is the inner end of each of a corresponding fiber reinforcing layer of the fiber reinforcing layers,
an outer end of each of the second reinforcing plies is the outer end of the corresponding fiber reinforcing layer,
the tag member is located proximate to at least one of the sidewalls,
the tag member is in contact with the corresponding apex on a radially outer side of the end of the corresponding turned-up portion,
the RFID tag is located between the end of the corresponding turned-up portion and the outer end of the corresponding apex in the radial direction,
the outer end of each of the second reinforcing plies is located radially outward of an outer end of a corresponding first reinforcing ply,
a ratio of a radial height of the outer end of each of the apexes to a radial height of the outer end of the corresponding fiber reinforcing layer is not less than 1.15 and not greater than 1.80,
the RFID tag is located radially outward of the outer end of the corresponding fiber reinforcing layer,
a stiffness of the protector is substantially equal to a stiffness of a corresponding outer apex,
the stiffness of the outer apex is substantially equal to a stiffness of a corresponding sidewall, or is harder than the stiffness of the corresponding sidewall,
the protector is directly covered, from outside the protector, by the corresponding sidewall, and the stiffness of the corresponding sidewall is substantially equal to the stiffness of the protector, or is softer than the stiffness of the protector, and
an inner end of each of the second reinforcing plies is located axially inward of an axially inner end of the corresponding core.

2. The heavy duty tire according to claim 1, wherein the outer end of each of the apexes is located radially inward of a maximum width position of the tire.

3. The heavy duty tire according to claim 1, wherein the outer end of each of the first reinforcing plies is located radially outward of the end of the turned-up portion.

4. The heavy duty tire according to claim 3, wherein a distance in the radial direction from the outer end of each of the first reinforcing plies to the end of the corresponding turned-up portion is not less than 5.0 mm and not greater than 15 mm.

5. The heavy duty tire according to claim 1, wherein a ratio of a radial height of an outer end of each of the chafers to a radial height of the outer end of the corresponding fiber reinforcing layer is not less than 0.70 and not greater than 1.20.

6. The heavy duty tire according to claim 1, wherein a distance in the radial direction from the outer end of each of the first reinforcing plies to the outer end of a corresponding second reinforcing ply is not less than 5.0 mm and not greater than 15 mm.

7. The heavy duty tire according to claim 1, wherein the RFID tag is located radially outward of the outer end of the corresponding first reinforcing ply.

8. The heavy duty tire according to claim 1, wherein the outer end of each of the inner apexes is located between the end of the corresponding turned-up portion and the outer end of the corresponding fiber reinforcing layer in the radial direction.

9. The heavy duty tire according to claim 1, wherein each of the outer apexes is more flexible than the corresponding chafer.

10. The heavy duty tire according to claim 1, wherein each of the chafers is harder than the corresponding sidewall.

11. The heavy duty tire according to claim 1, further comprising a pair of interlayer strips each located between each of the fiber reinforcing layers and the corresponding bead,
wherein each of the interlayer strips is in contact with the corresponding apex on the radially outer side of the end of the corresponding turned-up portion, and is in contact with the corresponding fiber reinforcing layer on the radially outer side of the outer end of the corresponding steel reinforcing layer,
each apex further includes an edge strip,
each of the edge strips is located axially outward of the corresponding outer apex, and is located between the outer end of the corresponding fiber reinforcing layer and an inner end of the corresponding outer apex in the radial direction,
each of the interlayer strips is harder than the corresponding sidewall, and is more flexible than the corresponding chafer, and
each of the edge strips is more flexible than the corresponding chafer, and is harder than the corresponding outer apex.

12. The heavy duty tire according to claim 11, wherein a complex elastic modulus of each of the interlayer strips is not less than 7.0 MPa and not greater than 12 MPa, and
a complex elastic modulus of each of the edge strips is not less than 7.0 MPa and not greater than 12 MPa.

13. The heavy duty tire according to claim 1, wherein the outer end of each of the inner apexes is located radially outward of the outer end of the corresponding first reinforcing ply.

14. The heavy duty tire according to claim 1, wherein an outer end of each of the chafers is located radially inward of the outer end of a corresponding second reinforcing ply.

* * * * *